United States Patent
Hundemer

(10) Patent No.: US 10,277,923 B2
(45) Date of Patent: *Apr. 30, 2019

(54) USING A DIGITAL VIDEO EFFECT TO GENERATE A VIDEO STREAM

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

(*) Notice: Subject to any disclaimer, the term of this patent is extended or adjusted under 35 U.S.C. 154(b) by 554 days.

This patent is subject to a terminal disclaimer.

(21) Appl. No.: 14/329,632

(22) Filed: Jul. 11, 2014

(65) Prior Publication Data

US 2015/0237414 A1    Aug. 20, 2015

Related U.S. Application Data

(60) Provisional application No. 61/941,267, filed on Feb. 18, 2014.

(51) Int. Cl.
*H04N 21/266* (2011.01)
*H04N 21/234* (2011.01)
*H04N 21/24* (2011.01)
*H04N 21/81* (2011.01)
*H04H 20/10* (2008.01)
(Continued)

(52) U.S. Cl.
CPC ...... *H04N 21/23418* (2013.01); *H04H 20/10* (2013.01); *H04H 20/103* (2013.01); *H04H 60/04* (2013.01); *H04H 60/06* (2013.01); *H04H 60/07* (2013.01); *H04N 21/23424* (2013.01); *H04N 21/2402* (2013.01);
(Continued)

(58) Field of Classification Search
USPC .............................................. 725/35, 38, 47
See application file for complete search history.

(56) References Cited

U.S. PATENT DOCUMENTS 4,163,992 A    8/1979  Inaba et al.
6,020,931 A    2/2000  Bilbrey
(Continued)

FOREIGN PATENT DOCUMENTS

EP        2145468 B1    9/2012

OTHER PUBLICATIONS

Hundemer, Hank J., U.S. Appl. No. 14/329,619, filed Jul. 11, 2014.
(Continued)

*Primary Examiner* — Mulugeta Mengesha
*Assistant Examiner* — Charles N Hicks
(74) *Attorney, Agent, or Firm* — McDonnell Boehnen Hulbert & Berghoff LLP

(57) ABSTRACT

In one aspect, a method involves (i) accessing data representing a traffic schedule for a television broadcast; (ii) selecting a record from the traffic schedule, wherein the record identifies video content; (iii) determining a type of the identified video content; (iv) using the determined type of the identified video content as a basis to select a DVE; and (v) causing a computing device to run the selected DVE, wherein running the selected DVE causes the computing device to generate a modified version of an input video stream representing the identified video content.

17 Claims, 7 Drawing Sheets

(51) Int. Cl.
*H04H 60/06* (2008.01)
*H04H 60/04* (2008.01)
*H04H 60/07* (2008.01)
*H04N 21/488* (2011.01)
*H04N 21/854* (2011.01)

(52) U.S. Cl.
CPC ..... *H04N 21/4886* (2013.01); *H04N 21/8126* (2013.01); *H04N 21/854* (2013.01)

(56) References Cited

U.S. PATENT DOCUMENTS

| | | | |
|---|---|---|---|
| 6,698,020 | B1 | 2/2004 | Zigmond et al. |
| 8,539,526 | B1 | 9/2013 | Hundemer |
| 2001/0003846 | A1* | 6/2001 | Rowe ............... G11B 27/031 725/47 |
| 2002/0109710 | A1 | 8/2002 | Holtz et al. |
| 2004/0027368 | A1 | 2/2004 | Snyder et al. |
| 2006/0026638 | A1* | 2/2006 | Stark et al. ................ 725/38 |
| 2006/0230427 | A1 | 10/2006 | Kunkel et al. |
| 2007/0182864 | A1 | 8/2007 | Stoneham et al. |
| 2008/0225179 | A1 | 9/2008 | Casper et al. |
| 2013/0232527 | A1 | 9/2013 | Kamijima |
| 2014/0201773 | A1 | 7/2014 | Neumeier et al. |

OTHER PUBLICATIONS

Hundemer, Hank J., U.S. Appl. No. 14/329,652, filed Jul. 11, 2014.
Non-final Office Action dated Jun. 26, 2015 issued in U.S. Appl. No. 14/329,619.
International Search Report and Written Opinion dated May 26, 2015, issued in connection with PCT Application No. PCT/US2015/016458 filed Feb. 18, 2015.
Final Office Action dated Oct. 30, 2015 issued in U.S. Appl. No. 14/329,619.
School Closings Attendant, last accessed May 1, 2017, 2 pages, available at http://bti.tv/index.php/solutions/school-closings.
School Closings Attendant, last accessed May 1, 2017, 2 pages, available at http://bti.tv/images/SCPage/SCProductBrief.pdf.
Non-Final Office Action dated Feb. 22, 2017 issued in U.S. Appl. No. 14/329,652.
Final Office Action dated Jun. 13, 2017 issued in U.S. Appl. No. 14/329,652.
Avid on-air graphics solutions: complete capability, last accessed Jul. 10, 2017, 6 pages, available at: http://www.avid.com/Static/resources/common/documents/solutions/onair_sb.pdf.
Viz Multichannel User's Guide, last accessed May 4, 2017, 191 pages, available at: http://docs.vizrt.com/viz-multichannel-guide-2.6.pdf.
GV Edge Integrated Playout System, last accessed May 4, 2017, 16 pages, available at: https://web.archive.org/web/20131204014817/http://www.grassvalley.com/docs/DataSheets/ips/gv_edge/SDP-5090D-4_GV_Edge_Solution.pdf.
What Is Channel Branding?, last accessed May 4, 2017, 3 pages, available at: http://cdn-docs.av-iq.com/other/Channel%20Box%20White%20Paper.pdf.
Final Office Action dated Jun. 2, 2016 issued in U.S. Appl. No. 14/329,652.
Office Action dated Dec. 1, 2015 issued in U.S. Appl. No. 14/329,652.
Notice of Allowance dated Jan. 28, 2019 for U.S. Appl. No. 14/329,619.

* cited by examiner

USING A DIGITAL VIDEO EFFECT TO GENERATE A VIDEO STREAM

CROSS REFERENCES TO RELATED APPLICATIONS

This disclosure claims priority to U.S. Provisional Application No. 61/941,267, entitled "Using a Digital Video Effect to Generate a Video Stream," which was filed on Feb. 18, 2014, and which is hereby incorporated by reference herein.

This disclosure also relates to (i) U.S. patent application Ser. No. 14/329,619, entitled "Using a Digital Video Effect to Generate a Video Stream," and (ii) U.S. patent application Ser. No. 14/329,652, entitled "Using a Digital Video Effect to Generate a Video Stream," both of which (i) are assigned to the assignee of the present disclosure, (ii) are being filed simultaneously with the present disclosure, (iii) and are hereby incorporated by reference herein in their entirety.

USAGE AND TERMINOLOGY

In this disclosure, unless otherwise specified and/or unless the particular context clearly dictates otherwise, each usage of "a" or "an" means at least one, and each usage of "the" means the at least one.

TECHNICAL FIELD

This disclosure relates generally to digital video effects and television-broadcasting systems.

BACKGROUND

A computing device may perform functions or acts related to digital video effects (DVE). For example, the computing device may, based on user input, design and/or run a DVE. As a result of the computing device running a DVE, the computing device may generate a video stream. As such, the design of a DVE may affect the corresponding generated video stream. In one example, a DVE may be designed such that the computing device generates the corresponding video stream by manipulating an input video stream, such as by scaling video content represented by the input video stream and/or or by overlaying text or other content on the video content. In one example, this may occur in connection with a television-broadcasting system.

Typically, a television-broadcasting system includes a master control system, which serves as a technical hub of the television-broadcasting system and is the final point before a video stream is sent to an air-chain system for broadcast. The master control system may include a computing device known as a stunt switcher that may run a DVE and as a result, may use an input video stream to generate an output a video stream for broadcast.

In the context of a television-broadcasting system, an example DVE may be designed such that the stunt switcher uses an input video stream to generate a video stream by overlaying school-related alerts (e.g., in the form of rotating text or graphics) on a lower-third portion of video content represented by the input video stream. This is a common way in which a media organization affiliated with the television-broadcasting system may provide to its viewers an indication that certain schools may be closed for the day due to bad weather, for instance. Depending on the design of the DVE, the stunt switcher may overlay the school-related alerts for a predetermined duration or until the stunt switcher runs another DVE to "clear" the alerts.

SUMMARY

In one aspect, a method involves (i) accessing data representing a traffic schedule for a television broadcast; (ii) selecting a record from the traffic schedule, wherein the record identifies video content; (iii) determining a type of the identified video content; (iv) using the determined type of the identified video content as a basis to select a DVE; and (v) causing a computing device to run the selected DVE, wherein running the selected DVE causes the computing device to generate a modified version of an input video stream representing the identified video content.

In another aspect, a non-transitory computer-readable storage medium has stored thereon program instructions that when executed by a processor, cause performance of a set of acts including (i) accessing data representing a traffic schedule for a television broadcast; (ii) selecting a record from the traffic schedule, wherein the record identifies video content; (iii) determining a type of the identified video content; (iv) using the determined type of the identified video content as a basis to select a DVE; and (v) causing a computing device to run the selected DVE, wherein running the selected DVE causes the computing device to generate a modified version of an input video stream representing the identified video content.

In another aspect, a method involves (i) accessing data representing a traffic schedule for a television broadcast; (ii) selecting a record from the traffic schedule, wherein the record identifies video content; (iii) determining a type of a portion of the identified video content; (iv) using the determined type of the portion of the identified video content as a basis to select a DVE; and (v) causing a computing device to run the selected DVE, wherein running the selected DVE causes the computing device to generate a modified version of an input video stream representing the portion of the identified video content.

These, as well as other aspects, advantages, and alternatives, will become apparent to those of ordinary skill in the art by reading the following detailed description, with reference where appropriate to the accompanying drawings.

DETAILED DESCRIPTION OF THE DRAWINGS

I. Overview

Figure 1:
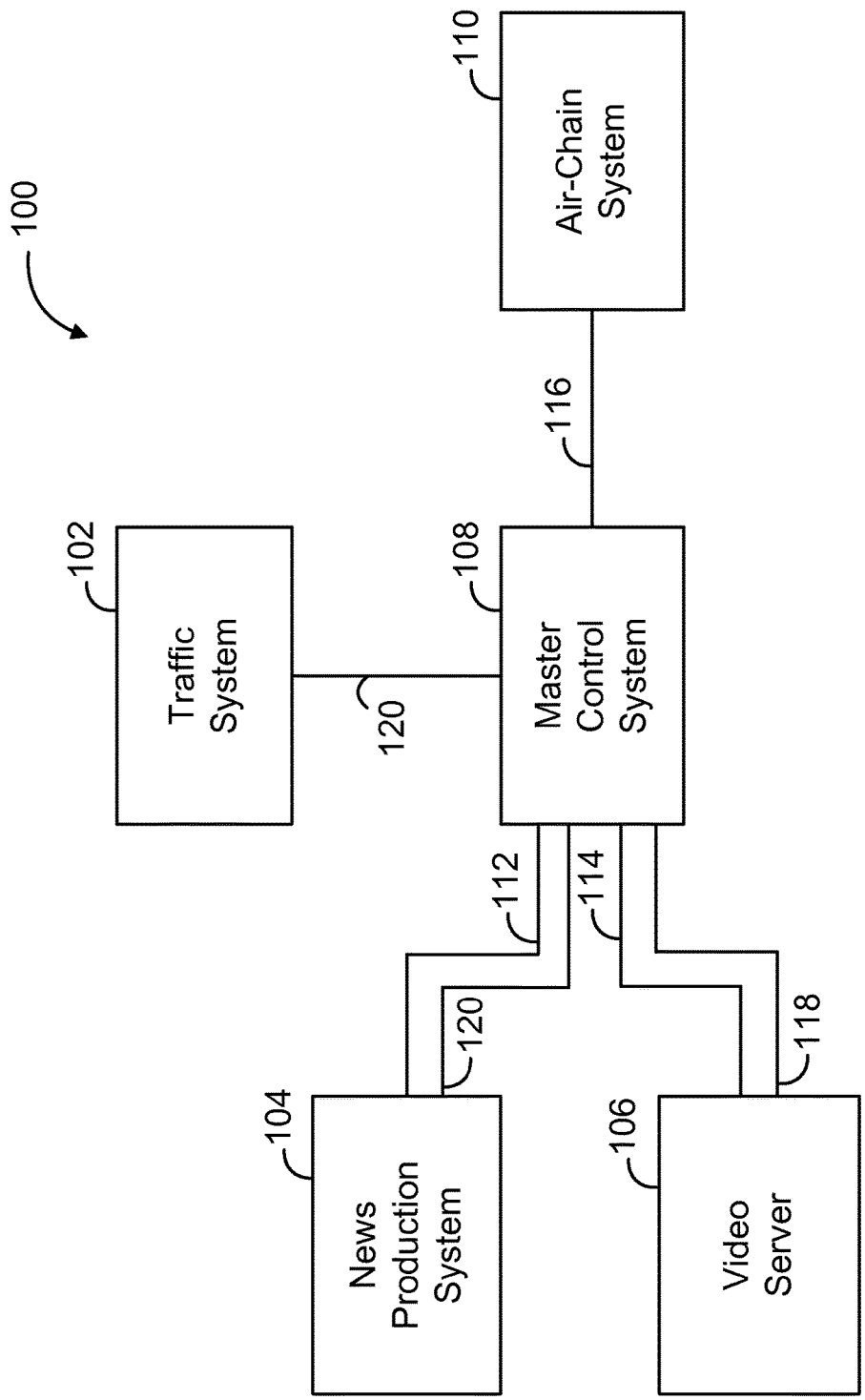
FIG. 1 is a simplified block diagram of an example television-broadcasting system.

As described above, in an example television-broadcasting system, a stunt switcher may run a DVE that causes the stunt switcher to generate an output video stream for broadcast by overlaying school-related alerts on a lower-third portion of video content represented by an input video stream. To increase the chance that viewers see these alerts, it may be desired to broadcast the alerts consistently during a particular time period. As such, in one example, a user may cause the stunt switcher to run the DVE at 6:00 am, and then cause the stunt switcher to run another DVE at 10:00 am to "clear" the alerts.

However, while this may increase the chance that viewers see the alerts, overlaying alerts (or other content) in this manner may have some undesired effects. To illustrate this, assume that from 6:00 am to 7:00 am, the television-broadcasting system is scheduled to broadcast a one-hour set of video content that includes a mix of news program segments (collectively making up a news program) and commercials. This information may be specified in a traffic schedule (sometimes referred to as a "traffic log"). As such, the traffic schedule may specify that the one-hour broadcast begins with a six-minute news program segment followed by a set of eight thirty-second commercials, followed by another six-minute news program segment, and so forth.

By using the technique described above, a user may cause the stunt switcher to overlay the school-related alerts on the entire set of video content as it is being broadcast. But in some instances, a media organization may find this undesirable as the alerts may obstruct portions of the commercials (e.g., portions that includes disclaimer text) that the media organization may seek to keep unobstructed. The media organization may seek to keep these portions unobstructed for a variety of reasons, such as to adhere to a contractual agreement with a commercial provider or to adhere to industry regulations, for instance.

As one approach to addressing this issue, a user may design the DVE in a different manner so that these obstruction do not occur. For example, the user may design the DVE such that the stunt switcher generates the corresponding video stream by vertically squeezing and upwardly shifting the video content represented by the input video stream, thereby creating a bar of "empty" video content below the "original" video content, and overlaying the alerts on that empty video content. As a result, the alerts do not obstruct any portions of the commercials (or any other original video content for that matter). However, in some instances, a media organization may find this undesirable as running this type of DVE instead causes distortion of the original video content (i.e., by vertically squeezing the original video content).

Notably, while a media organization may be willing to tolerate the distortion of some types of video content, it may be unwilling to tolerate distortion of other types of video content. For example, while the media organization may be willing to tolerate distortion of a commercial, it may not be willing to tolerate distortion a news program segment, as the latter may result in an unflattering depiction of a news anchor or another person affiliated with the media organization.

In one aspect of the present disclosure, a television-broadcasting system includes a stunt switcher and an automation system that accesses data representing a traffic schedule for a television broadcast and selects a record from the traffic schedule, wherein the record identifies a video source. The automation system then determines a type of the identified video source, and uses the determined type of the identified video source as a basis to select a DVE. Then, the automation system causes the stunt switcher to run the selected DVE, wherein running the selected DVE causes the stunt switcher to generate a modified version of an input video stream received from the identified video source. Video content represented by the generated video stream may then be encoded and broadcast to viewers.

In one example, the automation system determining the type of the indicated video source involves the automation system determining that the video source is a news production system, which in turn may suggest that the input video stream represents a news program segment. Accordingly, in this example, the automation system may select a DVE that is designed such that the stunt switcher generates the video stream by overlaying school-related alerts on the video content represented by the input video stream, but without distorting (e.g., by vertically squeezing) the video content. Accordingly, the automation system may cause the school-related alerts to be overlayed on a news program segment without distorting the news program segment.

In another aspect of the present disclosure, the automation system may select a record from the traffic schedule, wherein the record identifies video content. The automation system then determines a type of the video content, and uses the determined type of video content as a basis to select a DVE. Then, the automation system causes the stunt switcher to run the selected DVE, wherein running the selected DVE causes the stunt switcher to generate a modified version of an input video stream representing the identified video content. The video content represented by the generated video stream may then be encoded and broadcast to viewers.

In one example, the automation system determining the type of the identified video content involves the automation system determining that the video content is a commercial. Accordingly, in this example, the automation system may select a DVE that is designed such that the stunt switcher generates the video stream by vertically squeezing and upwardly shifting the video content, and by overlaying the school-related alerts on the bar of "empty" video content below the original video content as described above. Accordingly, the automation system may cause the school-related alerts to be overlayed in connection with a commercial without actually obstructing the commercial.

Thus, in some examples, the automation system may ensure that school-related alerts are presented to viewers consistently over a desired duration, but in different manners depending on whether the underlying video content is a news program segment or a commercial so as to avoid the undesired issues discussed above. Also, the automation system may likewise select and cause the stunt switcher to run different DVEs in connection with other types of video sources or video content, as desired.

As noted above, a stunt switcher running a DVE may cause the stunt switcher to generate a modified version of an input video stream received from a video source. In some instances though, the input video stream may itself have been generated as a result of a DVE being run. For example, where the video source is a news production system, a production switcher in the news production system may run a first DVE that causes the production switcher to generate a second video stream that is a modified version of the first video stream. And then, as the second video stream is transmitted through a master control system, a stunt switcher in the master control system may run a second DVE that causes the stunt switcher to generate a third video stream that is a modified version of the second video stream.

In one example, the first DVE may be configured such that, when run, the production switcher generates the second video stream by overlaying weather information on a first area of the video content represented by the first video stream. And, the second DVE may be configured such that, when run, the stunt switcher generates the third video stream by overlaying school-related alerts on the same first area of the video content. As such, this may result in the school-related alerts being overlaid on the weather information, which may be visually unappealing to a viewer.

Accordingly, in another aspect of the present disclosure, a controller within a news production system may make a determination that the stunt switcher is scheduled to run the second DVE in connection with the second video stream, such as by receiving an alert from the automation system. Then, responsive to the controller making this determination, the controller may select a third DVE, and may cause the production switcher to run the selected third DVE, wherein running the selected third DVE causes the production switcher to generate the second video stream by modifying the first video stream. The video content represented by the generated third video stream may then be encoded and broadcast to viewers.

In one example, the selected third DVE is designed such that the production switcher running the selected third DVE causes the production switcher to overlay weather information on a second area of video content represented by the first video stream. Further, the automation system may cause the stunt switcher to run the second DVE, wherein running the second DVE causes the stunt switcher to generate a modified version of the second video stream by overlaying the school-related alerts on a second area of the video content, and where that second area is positioned below the first area. Accordingly, this may allow the television-broadcasting system to "stack" the weather information on top of the school-related alerts such so as to provide the news program segment, the weather information, and the school-related alerts to viewers in a visually appealing manner.

II. Example Television-Broadcasting System

FIG. 1 is a simplified block diagram of an example television-broadcasting system 100 in which aspects of the present disclosure can be implemented. As shown, the television-broadcasting system 100 includes a traffic system 102, a news production system 104, a video server 106, a master control system 108, and an air-chain system 110. Generally, in accordance with a traffic schedule created via the traffic system 102, video streams may be transmitted from the news production system 104 and/or the video server 106, through the master control system 108, and to the air-chain system 110 for television broadcast.

A. Computing Device

Each of the systems, devices, components or other entities described above, namely the traffic system 102, the news production system 104, the video server 106, the master control system 108, and the air-chain system 110 (and each sub-entity included therein) may be implemented in various ways. For example, one or more of these entities may be implemented as a computing device.

Figure 2:
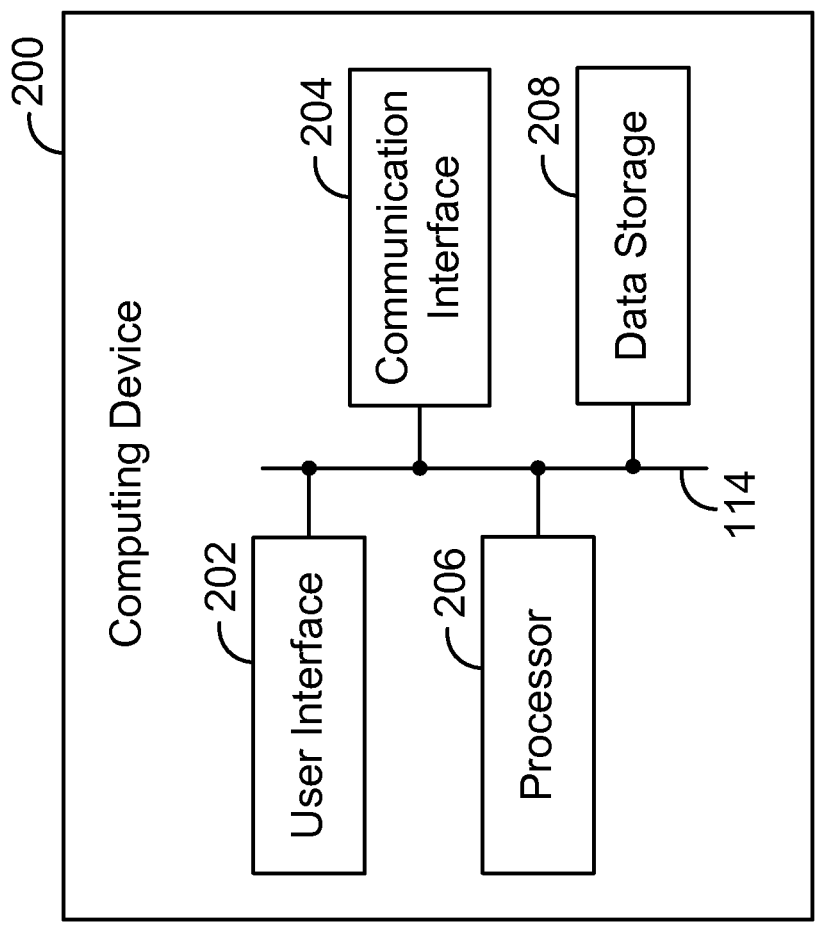
FIG. 2 is a simplified block diagram of an example computing device.

FIG. 2 shows an example of a computing device 200. The computing device 200 may take various forms, including for example, a mobile phone, tablet, laptop, or workstation. The computing device 200 may also include various components, including for example, a user interface 202, a communication interface 204, a processor 206, and a data storage 208, all of which may be communicatively connected to each other via a system bus, network, or other connection mechanism 210.

The user interface 202 may take a variety of forms and may facilitate interaction between the computing device 200 and a user of the computing device 200, such as by receiving input from the user and providing output to the user. Thus, the user interface 202 may include input components such as a computer mouse, a keyboard, a touch-sensitive panel, or perhaps a microphone for receiving voice commands. In addition, the user interface 202 may include output components such as a display screen (which, for example, may be combined with a touch-sensitive panel) a sound speaker, or a haptic feedback system. Other examples are possible as well.

The communication interface 204 may also take a variety of forms and may facilitate communication of data (e.g., instructions or video streams) between the computing device 200 and one or more other devices according to any number of protocols. In one example, the communication interface 204 may take the form of a wired interface, such as an Ethernet interface or a high-definition serial-digital interface (HD-SDI). As another example, the communication interface 204 may take the form of a wireless interface, such as a WiFi interface. In either case, the communication interface 204 may include communication input and/or communication output interfaces each of which may include one or more physical ports. Other examples are possible as well.

The processor 206 may also take a variety of forms and may include a general purpose processor (e.g., a microprocessor) and/or a special purpose processor (e.g., a digital signal processors (DSP)). Other examples are possible as well.

The data storage 208 may also take a variety of forms and may include one or more volatile, non-volatile, removable, and/or non-removable storage components, such as magnetic, optical, or flash storage, and may be integrated in whole or in part with the processor 206. In one example, the data storage 208 may take the form of a non-transitory computer-readable storage medium, having stored thereon program instructions (e.g., compiled or non-compiled program logic and/or machine code) that, when executed by the processor 206, cause the computing device 200 or another device to perform one or more functions or acts, such as those described in this disclosure. As such, the computing device 200 may be configured for performing such functions or acts. In some instances, the computing device 200 may cause another device to perform a function or act by transmitting a suitable instruction to that the device. The computing device 200 may also use the data storage 208 to store or retrieve various types of data such as the data described in this disclosure.

B. Traffic System

The traffic system 102 may perform functions or acts related to a traffic schedule for a television broadcast. For instance, the traffic system 102 may create or edit a traffic schedule, perhaps based on user input. In addition, the traffic system 102 may store or retrieve data representing a traffic schedule, or transmit data representing a traffic schedule to another device. For example, the traffic system 102 may transmit data representing a traffic schedule to an automation system such that the automation system may perform functions or acts in accordance with the traffic schedule.

Two example traffic systems are WO Traffic provided by WideOrbit Inc. of San Francisco, Calif., and OSi-Traffic™ provided by Harris Corporation of Melbourne, Fla. Other examples are possible as well.

Generally, a traffic schedule specifies an order of events that relate to a television broadcast for a given station during a given time period. The traffic schedule may include multiple ordered records, each corresponding to one or more of these events. A record may include one or more attributes, including for example, a video content identifier (sometimes referred to as a "house number"), a video source identifier, a duration, a start-time type, and a start time. Other attributes are possible as well.

A record may include at least one of either a video content identifier or a video source identifier. If the record corresponds to an event involving stored video content (e.g., playing a locally stored commercial), the record may include a video content identifier. A video content identifier identifies video content. In one example, a video content identifier may be a unique identifier within a given television-broadcasting system, and may map to a file location in a data storage where a video file representing the video content is stored. Therefore, based on the video content identifier, a video server may retrieve the video file, and generate and output a video stream representing the video content.

Alternatively, if the record corresponds to a video source, the record may include a video source identifier. A video source identifier identifies a video source. In one example, a video source identifier may be a unique identifier within a given television-broadcasting system, and may map to a video source that outputs video content in the form of a video stream. As such, whether a record includes a video content identifier or a video source identifier, the record may correspond to a video stream that represents video content.

The duration indicates the duration of the corresponding video stream. Further, the start-time type indicates how and/or when a start time for the corresponding video stream may be determined. The start-time type may be absolute, calculated, or manual. An absolute start-time type indicates that the start time is a fixed time that may be determined before any records in the traffic schedule are processed by an automation system. This is sometimes referred to as a "hard" start time. A calculated start-time type indicates that the start time is when the preceding record entry has "completed" (i.e., when the video stream corresponding to the previous record has played for its duration), and may be determined based on the start time and duration of the previous record. A manual start-time type indicates that the start time is when a request is received from a user or device, and therefore it cannot be determined until the request is received. Finally, the start time indicates the intended start time of the corresponding video stream.

C. News Production System

The news production system 104 may perform functions or acts related to producing a news program, which may involve running DVEs. In this context, the news production system 104 may produce a news program in accordance with a news program schedule (sometimes called a "rundown"), which specifies an order of events related to the production of the news program. For instance, a news program schedule may indicate that various video clips are to be loaded and played out by a video server in a particular order so that the video clips may be included as part of the news program.

The news production system 104 may perform functions or acts related to a news production schedule for a news program. For instance, the news production system 104 may create or edit a news program schedule, perhaps based on user input. In addition, the news production system 104 may store or retrieve data representing a news program schedule, or transmit data representing a news program schedule to another device. For example, the news production system 104 may transmit data representing a traffic schedule to an automation system such that the automation system may perform functions or acts based on that data.

The news production system 104 may also output the news program (perhaps as separate news program segments), and therefore the news production system 104 may serve as a video source. The news production system 104 may output the news program in various forms, including for example, in the form a video stream. Other examples are possible as well.

In some instances, the news production system may include a production switcher that may perform functions or acts related to DVEs. For example, the production switcher may design or run a DVE, perhaps based on input received from a user. In addition, the production switcher may store or retrieve data (e.g., program instructions) representing a DVE. The production switcher may perform these or other functions or acts in a same or similar manner to those described below in connection with the stunt switcher.

In some instances, the news production system 104 includes a controller that causes the news production system 104 to perform one or more functions or acts, such as those described herein. In some instances, the controller may be integrated with another device such as the production system.

D. Video Server

Generally, the video server 106 may perform functions or acts related to processing video files and video streams. For example, the video server 106 may receive a video stream from a video source, use the video stream to generate a video file, and store the video file. In addition, the video server 106 may retrieve a video file, use the video file to generate a video stream, and output the video stream. Accordingly, the video server 106 may also serve as a video source.

An example of a video server is the K2 server provided by Grass Valley™ of San Francisco, Calif. Other examples are possible as well.

E. Master Control System

The master control system 108 is the technical hub of the television-broadcasting system 100 and may perform functions or acts related to routing, switching, and/or manipulating video streams.

Figure 3:
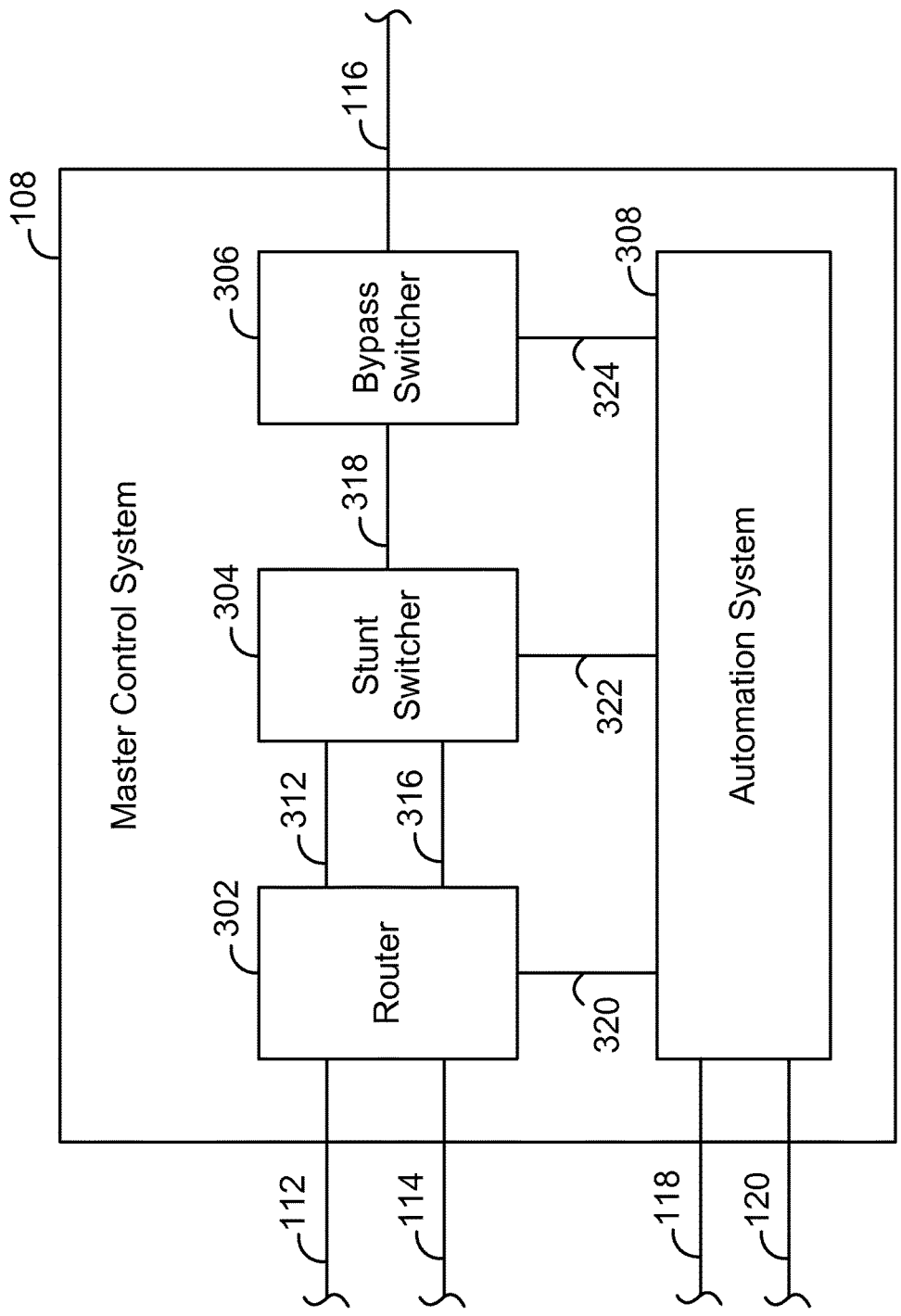
FIG. 3 is a simplified block diagram of an example master control system.

FIG. 3 shows the master control system 108 in greater detail. As shown, the master control system 108 includes a router 302, a stunt switcher 304, a bypass switcher 306, and an automation system 308.

1. Router

The router 302 may perform functions or acts related to mapping input ports to output ports. For example, the router 302 may map one of its input ports connected to the newsroom production system 104 via a communication path 112 to one of its output ports connected to an input port of the stunt switcher 304 via a communication path 312, thereby allowing a video stream output by the news production system 104 to be transmitted via the communication path 112, the router 302, and the communication path 312, to the stunt switcher 304.

As another example, the router 302 may map another one of its input ports connected to the video server 106 via a communication path 114 to another one of its output ports connected to another input port of the stunt switcher 304 via a communication path 316, thereby allowing a video stream output by the video server 106 to be transmitted via the communication path 114, the router 302, and the communication path 316, to the stunt switcher 304.

Though not shown, typically a router includes more input ports that output ports such that it can map some number of source devices to a fewer number of destination devices. An example of a router is the Blackmagic Design Videohub provided by Blackmagic Design Pty. Ltd. of Fremont, Calif. Other examples are possible as well.

2. Stunt Switcher

The stunt switcher 304 may perform functions or acts related to mapping input ports to output ports and related to DVEs. For example, the stunt switcher 304 may map the one of its input ports connected to the router 302 via the communication path 312 to one of its output ports connected to an input port of the bypass switcher 306 via a communication path 318, thereby allowing a video stream output by the stunt switcher 304 to be transmitted via the communication path 318 to the bypass switcher 306. As another example, the stunt switcher 304 may map the one of its input ports connected to the router 302 via the communication path 316 to the one of its output ports connected to the input port of the bypass switcher 306 via the communication path 318.

As noted above, the stunt switcher 304 may also perform functions or acts related to DVEs. For example, the stunt switcher 304 may design or run a DVE, perhaps based on input received from a user. In addition, the stunt switcher 304 may store or retrieve data (e.g., program instructions) representing a DVE.

The stunt switcher 304 may design a DVE by configuring one or more layers known as "keys." In one example, a DVE may be designed to, when run, use one or more keys to overlay text, graphics, video, or other content on underlying video content. In some instances, a DVE may be designed to, when run, reset the keys, thereby "clearing" any previously overlaid content.

In one example, the stunt switcher 304 may store data representing a DVE in a particular DVE register within a data storage. Further, the stunt switcher 304 may store text, graphics, or other content to be used in connection with the DVE. Therefore, by overwriting the content, the result of the stunt switcher 304 running the DVE may be altered.

When running a DVE, the stunt switcher 304 may receive content for use in generating a video stream in various ways. For example, the stunt switcher 304 may retrieve content from a particular DVE register indicated in the DVE. Additionally or alternatively, content may be transmitted to the stunt switcher 304 and received on an input port of the stunt switcher 304 as indicated in the DVE. As such, a video stream output by a video source, such as the news production system 104, may be transmitted to the stunt switcher 304 and used by the stunt switcher 304 to generate a video stream.

Additionally or alternatively, content output by another source, such as a character generator, may be transmitted to the stunt switcher 304 and used by the stunt switcher 304 to generate a video stream. For example, where a DVE is configured to provide school-related alerts such as those described above, the alerts may include data such as the school's name and an indication of the school's status, and the stunt switcher 304 may receive this data from a character generator. Depending on the design of the DVE, the stunt switcher 304 may combine this data with text, graphics, or other content to generate the alerts such that the stunt switcher 304 may generate a video stream by overlaying the alerts on video content. Since the character generator may continually provide updated data, the alerts may a "real-time" feel from the perspective of viewers.

An example of a stunt switcher is the Miranda NVISION NVS5100MC provided by NVision, Inc. of Coppell, Tex. Other examples are possible as well.

3. Bypass Switcher

The bypass switcher 306 may perform functions or acts related to mapping input ports to output ports. For example, the bypass switcher 306 may map the one of its input ports connected to the stunt switcher 304 via the communication path 318 to one its output ports connected to the air-chain system 110 via communication path 116.

Though now shown, typically another input port of the bypass switcher 306 is connected to a video source such as a back-up video source. Thus, by altering the input-to-output mappings of the bypass switcher 306, a video stream may be transmitted from the back-up video source to the air-chain system 110. This may act as a safeguard if, for e.g., the stunt switcher 304 malfunctions.

An example of a bypass switcher is the X-1202H switcher provided by Evertz Microsystems, Ltd. of Burlington, Ontario, Canada. Other examples are possible as well.

Accordingly, provided that the router 302, the stunt switcher 304, and the bypass switcher 306 have the appropriate input-to-output port mapping settings, a video stream output from the newsroom production system 104 may be transmitted through the master control system 108 (perhaps being manipulated in accordance with a DVE), and to the air-chain system 110 for broadcast. Likewise, given that these devices have the appropriate input-to-output port mapping settings, a video stream output from the video server 106 may be transmitted through the master control system 108 (again perhaps being manipulated in accordance with a DVE) and to the air-chain system 110 for broadcast.

4. Automation System

The automation system 308 may perform functions or acts to manage overall functionality of the television-broadcasting system 100. In one example, this may begin with the automation system 308 accessing data representing a traffic schedule. In some instances, this may involve the automation system 308 retrieving the data from the traffic system 102 via a communication path 120.

Based on the traffic schedule, the automation system 308 may perform one or more functions or acts to allow the television-broadcasting system 100 to carry out the events specified therein. In one example, this may involve the automation system 308 traversing records of the traffic schedule and performing functions or acts based on those traversed records. These acts may involve causing one or more entities in the television-broadcasting system 100 to perform a function or act. The automation system 308 may do this by sending instructions to such entities via one or more communication paths, including for example, communication paths 118, 320, 322, and 324 with the video server 106, the router 302, the stunt switcher 304, and the bypass switcher 306, respectively.

As noted above, the automation system 308 may perform functions or acts based on a record of a traffic schedule. For example, where the record includes a video source identifier that identifies the news production system 104, and a start time of 6:00 am, at 6:00 am, the automation system 308 may cause the router 302, the stunt switcher 304, and/or the bypass switcher 306 to use appropriate input-to-output port mappings such that a video stream output by the newsroom production system 104 is transmitted, though the master control system 108, to the air-chain system 110 for broadcast. As such, this may allow the television-broadcasting system 100 to broadcast a news program segment.

As another example, where a record includes a video content identifier that maps to a video file representing video content, and a start time of 6:06 am, the automation system 308 may cause the video server 106 to retrieve the video file and, at 6:06 am, use the video file to generate and output a video stream. Further, at 6:06 am, the automation system 308 may cause the router 302, the stunt switcher 304, and/or the bypass switcher 306 to use appropriate input-to-output port mappings such that the video stream output by the video server 106 is transmitted, though the master control system 108, to the air-chain system 110 for broadcast. This may allow the television-broadcasting system 100 to broadcast a commercial, for instance.

In some instances, the automation system 308 may also perform functions or acts based on data represented in a news program schedule (e.g., based on an indication that the news production system 104 is scheduled to run a DVE in connection with a video stream representing particular video content). As such, the automation system 308 may access data representing a news program schedule. In one example, this may involve the automation system 308 retrieving the data from the news production system 104 via a communication path 122.

F. Air-Chain System

The air-chain system 308 may perform functions or acts related to processing and delivering content. The air-chain system 110 may include an encoder and an outbound-broadcast device.

The encoder may perform functions or acts related to processing a video stream. For example, the encoder may receive a video stream output by the bypass switcher 306 via the communication path 116, and the encoder may encode video content represented by the received video stream. In one example, the encoder may encode video content based on the HD-SDI standard to video content based on the MPEG 2 standard.

An example of an encoder is the NetVX provided by Harris Corporation of Melbourne, Fla. Other examples are possible as well.

The outbound-broadcast device may perform functions related to distributing video content. As such, the outbound-broadcast device may output encoded video content received from the encoder. The outbound-broadcast device may take a variety of forms, including for example the form of a transmitter, satellite, or network connection (e.g., for an Internet feed). Other examples are possible as well.

III. Example Operations

Figure 4:
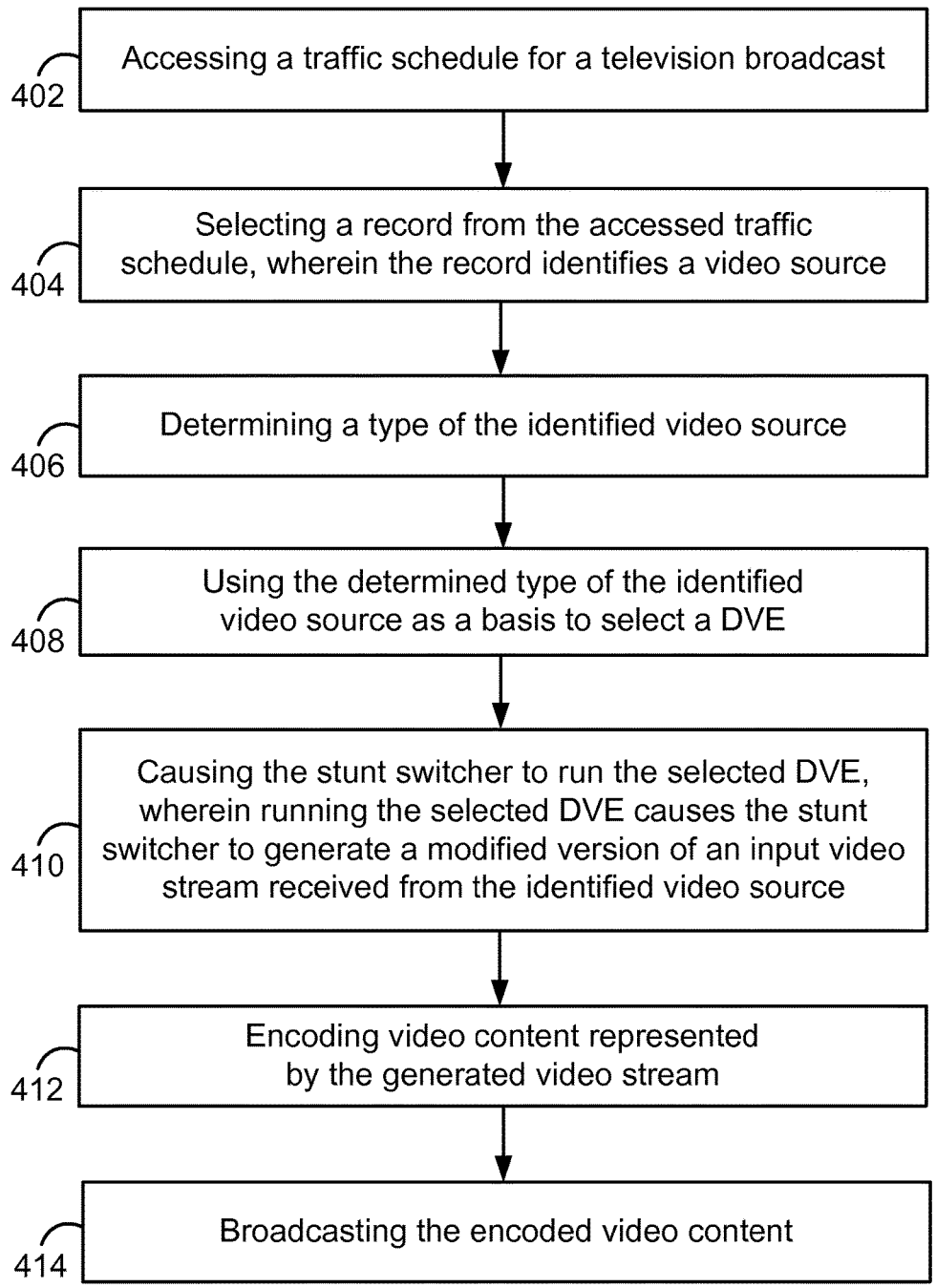
FIG. 4 is a flow chart showing acts of an example method.

FIG. 4 is a flow chart depicting acts that can be carried out in an example method. At block 402, the example method involves an automation system (or another computing device) accessing a traffic schedule for a television broadcast. At block 404, the method involves the automation system selecting a record from the accessed traffic schedule, wherein the record identifies a video source. In one example, the record may identify a video source by including a video source identifier that identifies the video source.

At block 406, the method involves the automation system determining a type of the identified video source. In one example, this may involve the automation system determining that the identified video source is a newsroom production system based on the video source identifier having a particular characteristic (e.g., a particular prefix) or based on the video source identifier being a predetermined video source identifier.

At block 408, the method involves the automation system using the determined type of the identified video source as a basis to select a DVE. This may involve the automation system using mapping data to map a determined type of a video source to a particular DVE. For example, mapping data may map a determined type of newsroom production system to a DVE that is designed such that, running the selected DVE causes a stunt switcher to generate a modified version of the input video stream by overlaying content on video content represented by the input video stream without distorting the video content. In some instances, the automation system may perform the acts at blocks 506 and 508 together by use mapping data that maps the video source identifier to a particular DVE.

At block 410, the method involves the automation system causing a stunt switcher (or another computing device) to run the selected DVE, wherein running the selected DVE causes the stunt switcher to generate a modified version of an input video stream received from the identified video source. Accordingly, in one example, the automation system may cause the school-related alerts to be overlayed on a news program segment without distorting the news program segment. However, the automation system may select, and cause the stunt switcher to run, other types of DVEs depending on the determined type of video source.

In some instances, the automation system may perform the act at block 410 in response to receiving a request from a user (e.g., a master control operator) via a user interface. Alternatively, the automation system may perform the act based on a determination that particular data is included in the traffic schedule, or based on some trigger event.

Also, in some instances, the automation system may cause the stunt switcher to run the DVE at or about the time that the corresponding video content is scheduled to be broadcast. However, in other instances, the automation system may run the DVE some amount of time before or after that time to provide a more aesthetic transmission from a viewer's perspective.

At block 412, the method involves an encoder encoding video content represented by the generated video stream. And at block 414, the method involves an outbound-broadcasting device broadcasting the encoded video content such that it may be distributed to and seen by viewers.

Figure 5:
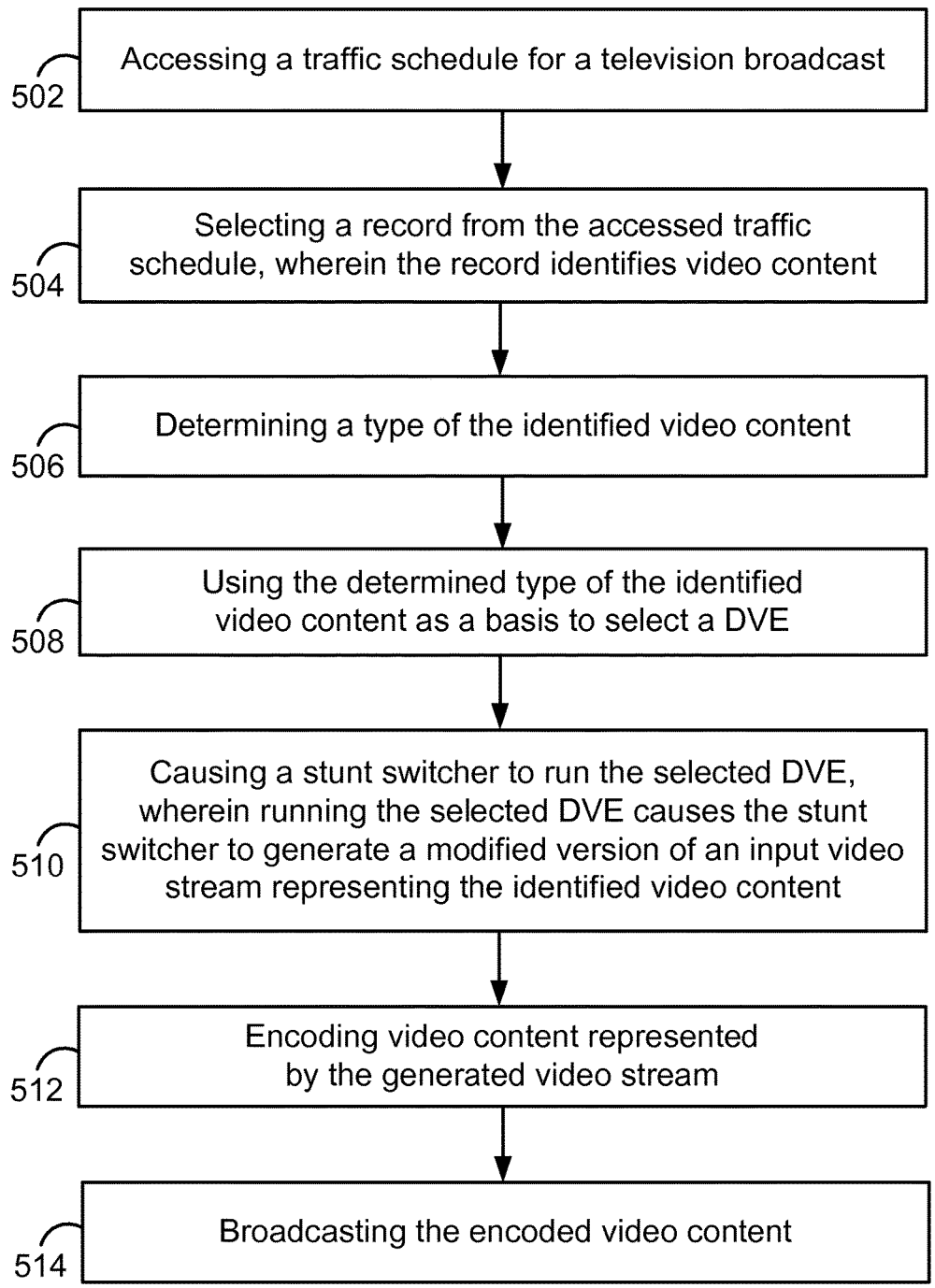
FIG. 5 is a flow chart showing acts of another example method.

FIG. 5 is a flow chart depicting acts that can be carried out in another example method. At block 502, the example method involves an automation system (or another computing device) accessing data representing a traffic schedule for a television broadcast.

At block 504, the method involves the automation system selecting a record from the accessed traffic schedule, wherein the record identifies video content. In one example, the record may identify video content by including a video content identifier that identifies the video content.

At block 506, the method involves the automation system determining a type of the identified video content. In one example, this may involve the automation system determining that the identified video content is a commercial based on the video content identifier having a particular characteristic (e.g., a particular prefix) or based on the video content identifier being a predetermined video content identifier.

At block 508, the method involves the automation system using the determined type of the identified video content as a basis to select a DVE. This may involve the automation system using mapping data to map a determined type of video content to a particular DVE. For example, mapping data may map a determined type of commercial to a DVE that is designed such that, running the selected DVE causes a stunt switcher to generate a modified version of an input video stream by modifying original video content represented by the input video stream such that the input video steam represents the original video content and empty video content, and by overlaying content on the empty video content. In some instances, the automation system may perform the acts at blocks 506 and 508 together by use mapping data that maps the video content identifier to a particular DVE.

At block 510, the method involves the automation system causing a stunt switcher (or another computing device) to run the selected DVE, wherein running the selected DVE causes the stunt switcher to generate a modified version of an input video stream representing the identified video content. Accordingly, in one example, the automation system may cause the school-related alerts to be overlayed on empty video content below a commercial (i.e., such that the alerts are not overlaid on the commercial itself). However, the automation system may select, and cause the stunt switcher to run, other types of DVEs depending on the determined type of video content.

In some instances, the automation system may perform the function at block 510 in response to receiving a request from a user (e.g., a master control operator) via a user interface. Alternatively, the automation system may perform the function based on a determination that particular data is included in the traffic schedule, or based on some trigger event.

Also, in some instances, the automation system may cause the stunt switcher to run the DVE at or about the time that the corresponding video content is scheduled to be broadcast, or perhaps some time before or after that time as discussed above.

At block 512, the method involves an encoder encoding video content represented by the generated video stream. And at block 514, the method involves an outbound-broadcasting device broadcasting the encoded video content such that it may be distributed to and seen by viewers.

Figure 6:
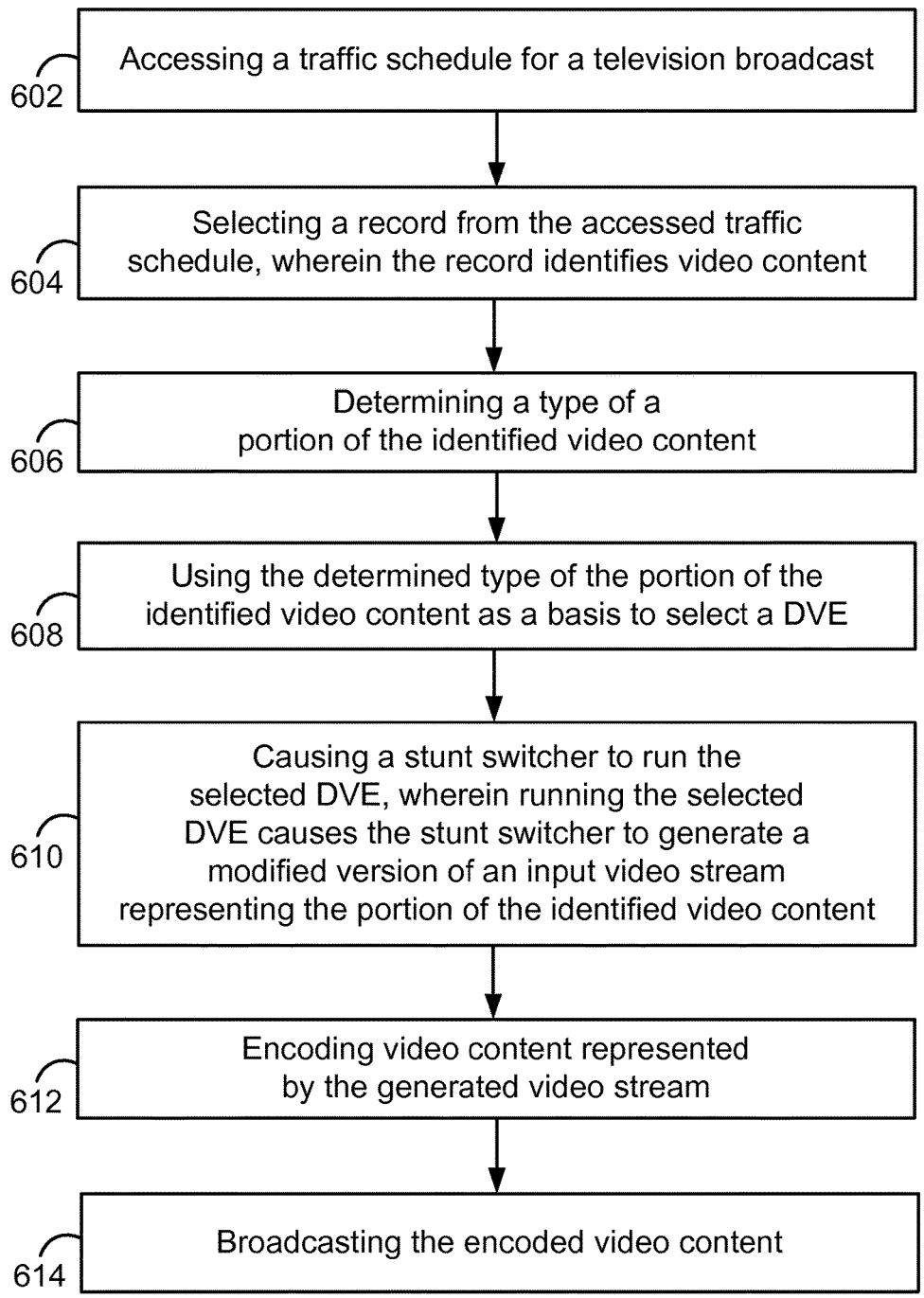
FIG. 6 is a flow chart showing acts of still another example method.

FIG. 6 is a flow chart depicting acts that can be carried out in another example method. At block 602, the example method involves an automation system (or another computing device) accessing data representing a traffic schedule for a television broadcast.

At block 604, the method involves the automation system selecting a record from the accessed traffic schedule, wherein the record identifies video content. In one example, the record may identify video content by including a video content identifier that identifies the video content.

At block 606, the method involves the automation system determining a type of a portion of the identified video content. In one example, this may involve the automation system determining that the portion of identified video content is a commercial based on data that indicates the same. For instance, such data may provide types of portions of video content based on starting and ending times (e.g., the data may indicate that for eight minutes of video content, the first six minutes are a portion of a show, and the last two minutes are commercials). In one example, a user may generate this data based on an analysis of the video content. In another example, a computing device may analyze the video content and use these analysis to automatically generate such data.

At block 608, the method involves the automation system using the determined type of the identified video content as a basis to select a DVE. This may involve the automation system using mapping data to map a determined type of video content to a particular DVE. For example, mapping data may map a type of commercial to a DVE that is designed such that, running the selected DVE causes a stunt switcher to generate the modified version of an input video stream by modifying original video content represented by the input video stream such that the modified video steam represents the original video content and empty video content, and by overlaying content on that empty video content. In some instances, the automation system may perform the acts at blocks 606 and 608 together by use mapping data that maps the video content identifier to a particular DVE.

At block 610, the method involves the automation system causing a stunt switcher (or another computing device) to run the selected DVE, wherein running the selected DVE causes the stunt switcher to generate a modified version of an input video stream representing the portion of the identified video content. Accordingly, in one example, the automation system may cause the school-related alerts to be overlayed on empty video content below a commercial (i.e., such that the alerts are not overlaid on the commercial itself). However, the automation system may select, and cause the stunt switcher to run, other types of DVEs depending on the determined type of the portion of video content.

In some instances, the automation system may perform the act at block 610 in response to receiving a request from a user (e.g., a master control operator) via a user interface. Alternatively, the automation system may perform the act based on a determination that particular data is included in the traffic schedule, or based on some trigger event.

Also, in some instances, the automation system may cause the stunt switcher to run the DVE at or about the time that the corresponding video content is scheduled to be broadcast, or perhaps some time before or after that time as discussed above.

At block 612, the method involves an encoder encoding video content represented by the generated video stream. And at block 614, the method involves an outbound-broadcasting device broadcasting the encoded video content such that it may be distributed to and seen by viewers.

Figure 7:
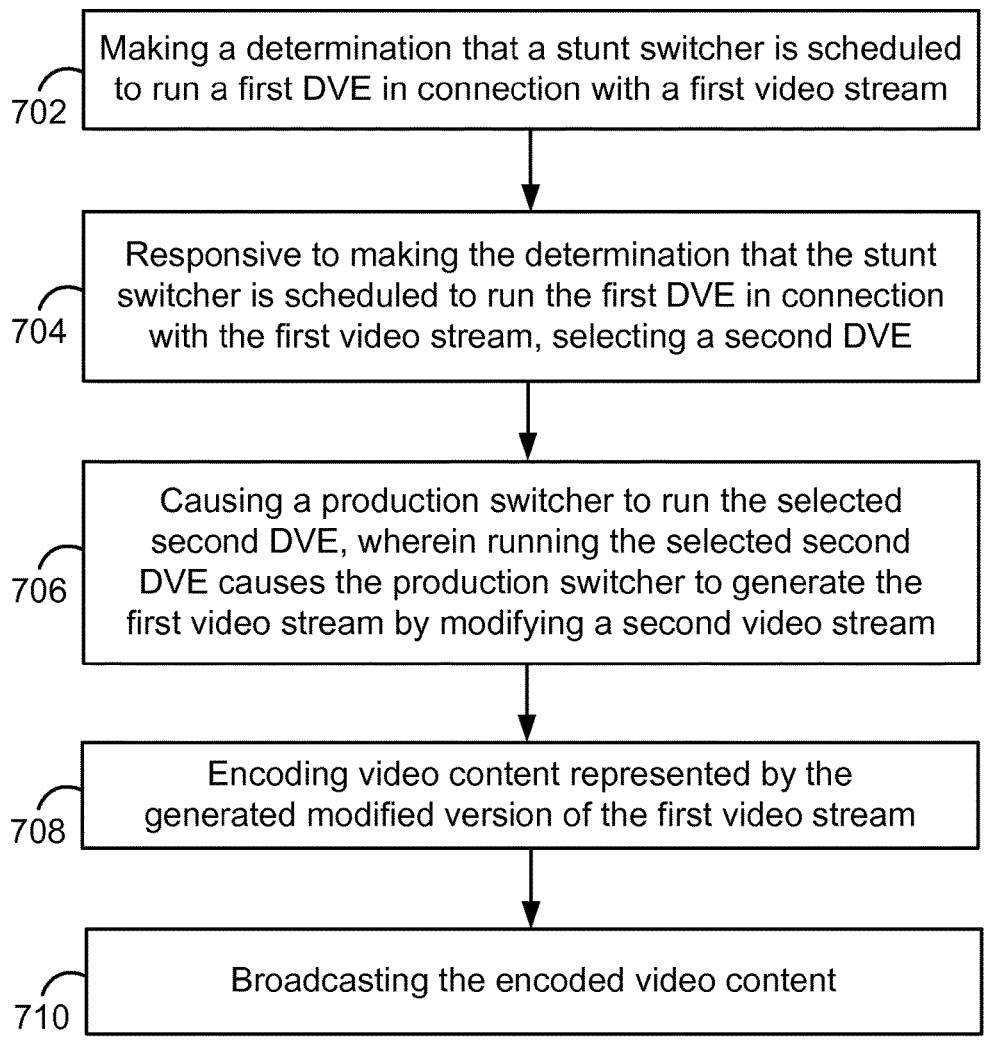
FIG. 7 is a flow chart showing acts of yet another example method.

FIG. 7 is a flow chart depicting acts that can be carried out in another example method. At block 702, the example method involves a controller (or another computing device) making a determination that a stunt switcher (or another computing device) is scheduled to run a first DVE in connection with a first video stream. In one example, this may involve the controller receiving an indication that the stunt switcher is scheduled to run the first DVE in connection with the first video stream. The controller may receive this indication from the stunt switcher or from an automation system for example.

In one example, the first DVE is designed such that the stunt switcher running the first DVE causes the stunt switcher to generate a modified version of the first video stream by overlaying first content on a first area of the video content.

At block 704, the method involves responsive to the controller making the determination that the stunt switcher is scheduled to run the first DVE in connection with the first video stream, selecting a second DVE. In one example, this may involve the controller using mapping data to map one DVE to another DVE.

In one example, the selected second DVE is designed such that the production switcher running the selected second DVE causes the production switcher to overlay second content on a second area of video content represented by the second video stream, where the first area is positioned below the second area.

At block 706, the method involves the controller causing a production switcher (or another computing device) to run the selected second DVE, wherein running the selected second DVE causes the production switcher to generate the first video stream by modifying a second video stream.

Accordingly, this may allow the first content (e.g., weather information) to be "stacked" on the second content (e.g., school-related alerts) so as to present the video content (e.g., a news program segment), the first content, and the second content to viewers in a visually appealing manner.

However, the controller may select, and cause the production switcher to run, other DVEs depending on, e.g., how the mapping data is configured.

In some instances, the controller may perform the act at block 706 in response to receiving a request from a user (e.g., a technical director) via a user interface. Alternatively, the controller may perform the act based on a determination that particular data is included in a news program schedule, or based on some trigger event.

Also, in some instances, the controller and/or the automation system may cause the production switcher and/or the stunt switcher to run their respective DVEs at or about the time that the corresponding video content is scheduled to be broadcast, or perhaps some time before or after that time as discussed above.

At block 708, the method involves an encoder encoding video content represented by the generated modified version of the first video stream. And at block 710, the method involves an outbound-broadcasting device broadcasting the encoded video content such that it may be distributed to and seen by viewers.

IV. Example Variations

The variations described in connection with select examples of the disclosed system and method may be applied to all other examples of the disclosed system and method. Further, while examples of the disclosed method have been described in connection with an example television-broadcasting system, the method may be implemented in other systems.

Also, while one or more functions or acts have been described as being performed by or otherwise related to certain entities (e.g., the automation system 308), the functions or acts may be performed by or otherwise related to any entity.

Further, the functions or acts need not be performed in the disclosed order, although in some examples, an order may be preferred. Also, not all functions or acts need to be performed to achieve the desired an advantage of the disclosed system and method, and therefore not all functions or acts are required.

While select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

The invention claimed is:

1. A method comprising:
   accessing data representing a traffic schedule for a television broadcast;
   selecting a record from the traffic schedule, wherein the record identifies video content;
   determining a type of the identified video content, wherein determining the type of the identified video content comprises determining that the identified video content is a commercial;
   using the determined type of the identified video content as a basis to select a digital video effect (DVE); and
   causing a computing device to run the selected DVE, wherein running the selected DVE causes the computing device to generate a modified version of an input video stream representing the identified video content.

2. The method of claim 1, wherein the selected DVE is designed such that, running the selected DVE causes the computing device to generate the modified version of the input video stream by modifying original video content represented by the input video stream such that the input video steam represents the original video content and empty video content, and by overlaying content on the empty video content.

3. The method of claim 2, wherein the overlaid content comprises school-related data.

4. The method of claim 1, wherein causing the computing device to run the selected DVE comprises transmitting to the computing device an instruction to run the selected DVE.

5. The method of claim 1, further comprising causing the input video stream to be transmitted to the computing device.

6. The method of claim 1, further comprising:
   encoding video content represented by the generated video stream; and
   broadcasting the encoded video content.

7. A non-transitory computer-readable storage medium having stored thereon program instructions that when executed by a processor cause performance of a set of acts comprising:
   accessing data representing a traffic schedule for a television broadcast;
   selecting a record from the traffic schedule, wherein the record identifies video content;
   determining a type of the identified video content, wherein determining the type of the identified video content comprises determining that the identified video content is a commercial;
   using the determined type of the identified video content as a basis to select a digital video effect (DVE); and
   causing a computing device to run the selected DVE, wherein running the selected DVE causes the computing device to generate a modified version of an input video stream representing the identified video content.

8. The computer-readable storage medium of claim 7, wherein the selected DVE is designed such that, running the selected DVE causes the computing device to generate the modified version of the input video stream by modifying original video content represented by the input video stream such that the input video steam represents the original video content and empty video content, and by overlaying content on the empty video content.

9. The computer-readable storage medium of claim 8, wherein the data comprises school-closing data.

10. The computer-readable storage medium of claim 7, wherein causing the computing device to run the selected DVE comprises transmitting to the computing device an instruction to run the selected DVE.

11. The computer-readable storage medium of claim 7, wherein the set of acts further comprises causing the input video stream to be transmitted to the computing device.

12. The computer-readable storage medium of claim 7, wherein the set of acts further comprises:
   encoding video content represented by the generated video stream; and
   broadcasting the encoded video content.

13. A method comprising:
   accessing data representing a traffic schedule for a television broadcast;
   selecting a record from the traffic schedule, wherein the record identifies video content;
   determining a type of a portion of the identified video content, wherein determining the type of the portion of the identified video content comprises determining that the identified video content is a commercial;

using the determined type of the portion of the identified video content as a basis to select a digital video effect (DVE); and causing a computing device to run the selected DVE, wherein running the selected DVE causes the computing device to generate a modified version of an input video stream representing the portion of the identified video content.

14. The method of claim 13, wherein the selected DVE is designed such that, running the selected DVE causes the computing device to generate the modified version of the input video stream by modifying original video content represented bythe input video stream such that the input video steam represents the original video content and empty video content, and by overlaying content on the empty video content.

15. The method of claim 14, wherein the overlaid content comprises school-related data.

16. The method of claim 13, further comprising causing the input video stream to be transmitted to the computing device.

17. The method of claim 13, further comprising:
encoding video content represented by the generated video stream; and
broadcasting the encoded video content.

* * * * *